US005082478A

United States Patent [19]

Oono et al.

[11] Patent Number: 5,082,478

[45] Date of Patent: Jan. 21, 1992

[54] PARTICULATE TRAP FILTER REGENERATIVE SYSTEM

[75] Inventors: Michio Oono; Meiro Nagata, both of Kokubu, Japan

[73] Assignee: Kyocera Corporation, Kyoto, Japan

[21] Appl. No.: 593,097

[22] Filed: Oct. 3, 1990

[30] Foreign Application Priority Data

Oct. 6, 1989 [JP] Japan .............................. 1-118193[U]

[51] Int. Cl.5 .......................... F01N 3/02; B01D 39/20

[52] U.S. Cl. ........................................ 55/466; 55/523; 55/DIG. 10; 55/DIG. 30; 60/303; 60/311

[58] Field of Search ................. 55/466, 528, DIG. 10, 55/DIG. 30; 60/303, 311, 320

[56] References Cited

U.S. PATENT DOCUMENTS

| | | | |
|---|---|---|---|
| 4,322,387 | 3/1982 | Virk et al. | 55/DIG. 30 |
| 4,363,644 | 12/1982 | Sato et al. | 55/DIG. 30 |
| 4,450,682 | 5/1984 | Sato et al. | 55/DIG. 30 |
| 4,481,767 | 11/1984 | Stark | 55/DIG. 10 |
| 4,502,278 | 3/1985 | Stark | 55/DIG. 10 |
| 4,571,938 | 2/1986 | Sakurai | 55/466 X |
| 4,615,173 | 10/1986 | Usui et al. | 55/466 X |
| 4,730,454 | 3/1988 | Pischinger et al. | 55/466 X |
| 4,858,431 | 8/1989 | Leonhard et al. | 55/466 X |
| 4,961,314 | 10/1990 | Howe et al. | 55/DIG. 30 |
| 4,991,396 | 2/1991 | Goerlich et al. | 60/311 X |

FOREIGN PATENT DOCUMENTS

| | | | |
|---|---|---|---|
| 2342472 | 4/1974 | Fed. Rep. of Germany | 55/DIG. 30 |
| 2342237 | 5/1974 | Fed. Rep. of Germany | 55/DIG. 30 |

*Primary Examiner*—Robert Spitzer
*Attorney, Agent, or Firm*—Spensley Horn Jubas & Lubitz

[57] ABSTRACT

A particulate trap filter regenerative system for eliminating the fullness of particulates to a particulate trap filter, which collects particulates in the exhaust gas of diesel engines and the like, by burning off the particulates causing the loading with the flame injected from a burner disposed on the upper flow side of the filter, wherein the burner is installed in such a way that the flame injection axis thereof crosses with the extension line of the axis of the particulate trap filter at an angle of 35 to 55 degrees and a flame distributor provided with plural through holes is disposed in such a way that it crosses with the extension line of the axis of the particulate trap filter at an angle which is greater by 10 to 20 degrees than the flame injection angle of the burner. A honeycomb disc body made of ceramics may be installed between the flame distributor and the particulate trap filter.

8 Claims, 1 Drawing Sheet

PARTICULATE TRAP FILTER REGENERATIVE SYSTEM

BACKGROUND OF THE INVENTION

1. Field of the Invention

This invention relates to a regenerative system for burning off the particulates trapped in particulate trap filters which collect them from the exhaust gas of diesel engines and the like.

2. Prior Art

In a diesel engine there has been conventionally provided an exhaust gas purification device in the exhaust pipe of the engine to prevent particulates produced by the combustion operation of the engine from being emitted into the air as black smoke. When a particulate trap filter housed in a cylindrical housing of the exhaust gas purification device is full of the particulates due to a prolonged use and the like, the back pressure of the filter will increase to drop of output power of the engine. To prevent this from happening, there is provided a burner at the sectional center of the exhaust pipe in the art to remove particulates such as carbon particulates accumulated on the filtering surface of the particulate trap filter by burning them off periodically or when the back pressure of the filter becomes higher than a fixed value. However, with the arrangement of the conventional burner mentioned above, when the flame from the burner is applied to the particulate trap filter as it is, since the flame flows more to the central portion of the filter than to the periphery thereof, the central portion tends to reach an elevated temperature and then the particulates like carbon particulates spread all over the filter surface will not burn uniformly. In addition, because of the localized heating of the particulate trap filter, the filter is likely to have damage including cracks between the peripheral and central portions thereof caused by thermal stresses set up therein due to temperature differential, or to be fused when the elevated temperature reaches the melting point.

To solve the problem above mentioned, there has been proposed in publications including Japanese Utility Model Laid-Open Publication No. 15713 of 1989 a particulate trap filter regenerative system in which a flame flow control member for diffusing the flame from the burner to the periphery inside the exhaust pipe is set up between the particulate trap filter and the burner. Because the flame flow control member is disposed at the location opposite to the end of the particulate trap filter, however, the flame flow control member multiplies its effect to diffuse the flame flow to the periphery inside the exhaust pipe together with a natural convection of the flame flow which occurs when the speed of the flame flow from the burner slows down, and hence the flame flow tends to propagate toward the upper part inside the exhaust pipe to result in an elevated temperature higher by about 400° C. or more at the upper peripheral portion of the particulate trap filter than the temperature at the central portion thereof. When the flame from the burner is injected in a slant manner with respect to the exhaust pipe, the flame will hit the lower part thereof and then propagate along the same. Thereupon, the lower peripheral portion of the particulate trap filter also reaches an elevated temperature higher by about 400° C. or more than the temperature at the central portion thereof as mentioned above.

Accordingly, because of the localized distribution of the flame with the variation in flow speed of the flame or in accordance with the injection angle thereof during an engine idling operation in which the flow of a exhaust gas becomes minimum for example, even the particulate trap filter regenerative system with the flame flow control member mentioned above cannot burn off the particulates uniformly. As a result, there likely arise problems such that the back pressure gradually increases to drop of the output power of the diesel engine or damage including cracks or fusing of the particulate trap filter caused by localized heating thereof occur.

SUMMARY OF THE INVENTION

The present invention is directed to overcoming the disadvantages in the prior art particulate trap filter regenerative system. Accordingly, it is an object of this invention to provide an improved regenerative system which is capable of eliminating the fullness of a particulate trap filter by uniformly burning off the particulates trapped in the filter without causing the damage including cracks or fusing of the filter even in the case where a variation of the burner flame in flow speed occurs or the injection direction of the burner flame crosses with that of the exhaust gas.

The particulate trap filter regenerative system of this invention provides a flame distributor provided with a plurality of through holes between a particulate trap filter and a burner located in an exhaust pipe, with the burner being disposed on the upper flow side of the filter in such a way that the flame injection axis thereof crosses with the extension line of the axis of the particulate trap filter at an angle of 35 to 55 degrees and the flame distributor being disposed in such a way that it crosses with the extension line of the axis of the particulate trap filter at an angle which is greater than the flame injection angle of the burner by 10 to 20 degrees. The flame distributor may preferably be provided with a plurality of parallel fins on the surface to which the flame is directly applied. In the particulate trap filter regenerative system thus constructed, when the flame injection angle of the burner disposed on the upper flow side of the filter becomes less than 35 degrees, a temperature at the lower portion of the particulate trap filter cannot be increased higher than the central portion thereof, and when that angle becomes larger than 55 degrees, the lower periphery of the particulate trap filter then conversely attains a localized high temperature and the burning condition of the burner is insufficient. The setting angle of the flame distributor determines the flame flow in relation to the flame injection angle, and it should be set to be larger by 10 to 20 degrees than the set flame injection angle to prevent a one-sided flow of the flame. In this way, the flame injection angle and the setting angle of the flame distributor have been specified as set forth in the appended claims, by which the variation of the flame temperature at the particulate trap filter inlet becomes around 100° C. maximum. The plural through holes made in the flame distributor are 3 to 10 mm in diameter, and preferably about 5.5 mm to attain a uniform temperature distribution of the flame. In addition, the total area of openings occupied by the through holes should be within the range of 25 to 35% of the flat area of the flame distributor including the openings occupied by the through holes to obtain a uniform flame temperature distribution through an appropriate turbulence resulted by the through holes thus arranged. Further more, by the provision of the plural fins to separate the flame in the exhaust pipe on the surface of the flame distributor to which the flame injected from the burner is directly applied for diffusing the flame, the temperature variation at the inlet of the particulate trap filter is restricted within 100° C. together with the effect of the through holes. The height of the fins is 2 to 8 mm, and preferably 4.5 to 5.5 mm, and by arranging them in parallel on the flame distributor in such a way that the nearer they are located to the burner, the lower their height becomes and the farther they are located from the burner, the higher their height becomes, the flame is most uniformly separated. For the flame distributor, sintered ceramics including silicon nitride ($Si_3N_4$), silicon carbide (SiC), cordierite ($2MgO.2Al_2O_3.5SiO_2$), mullite ($3Al_2O_3.2SiO_2$), and the like or heat-resistive alloy like stainless steel may be utilized.

The flame injected from the burner is not stable, that is, it has a movement what is called pulsation which causes a temperature variation of about 80° C. This temperature variation can be controlled to within 10° C. by installing a ceramic honeycomb disc body between the particulate trap filter and the flame distributor, immediately after the down flow side thereof so as to be disposed vertically and in coincidence with the extension line of the particulate trap filter. For the ceramic honeycomb disc body, sintered ceramics including silicon nitride ($Si_3N_4$), cordierite ($2MgO.2Al_2O_3.5SiO_2$), and the like may be utilized. The number of cells of the honeycomb disc body is preferably 50 to 100 per square inch to optimize the flame stabilizing effect in connection with the pressure loss of exhaust gas.

DETAILED DESCRIPTION OF THE PREFERRED EMBODIMENTS

Figure 1:
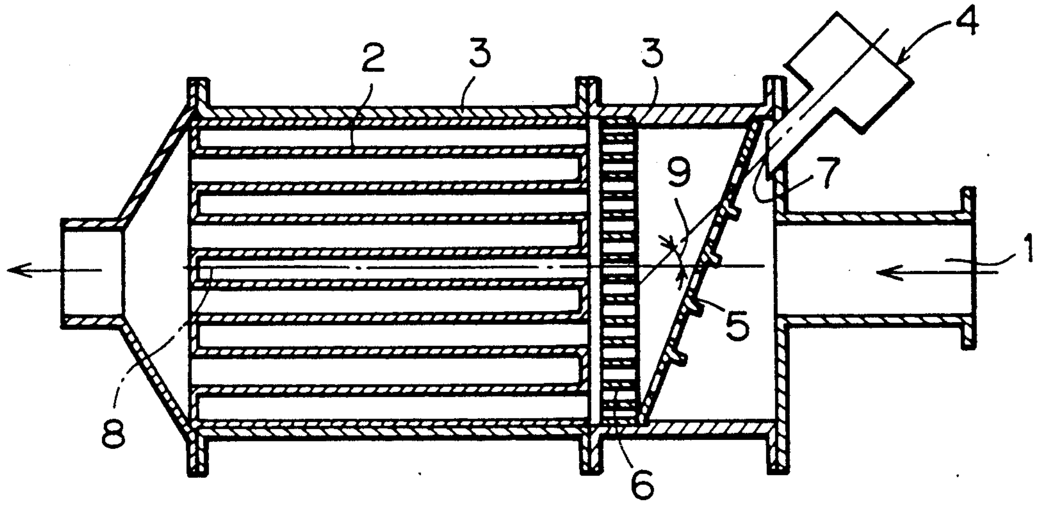
FIG. 1 is a sectional view showing one embodiment of the particulate trap filter regenerative system in accordance with this invention.
Figure 2:
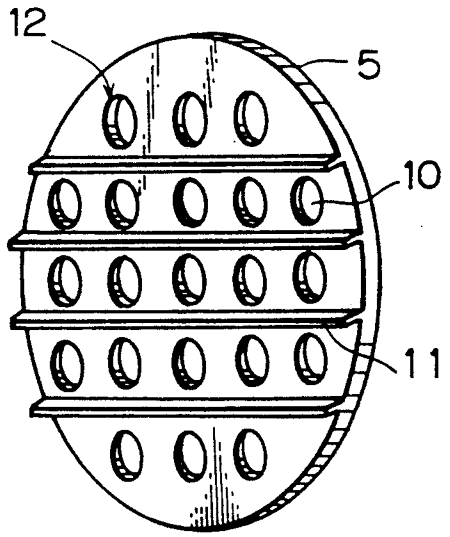
FIG. 2 is a perspective view of the flame distributor shown in FIG. 1.

One embodiment of this invention will now be explained in detail with reference to the accompanying drawings. Referring to FIGS. 1 and 2, there are shown an exhaust pipe 1, a particulate trap filter 2 housed in a cylindrical housing 3, a burner 4 installed on the upper flow side of the particulate trap filter at the upper portion of the end wall of the cylindrical housing 3, a flame distributor 5 and a honeycomb disc body 6 made of ceramics respectively disposed between the particulate trap filter 2 and the burner 4 with the flame distributor 5 being located on the upper flow side of the honeycomb disc body 6 which compose a particulate trap filter regenerative system. In the operation of the particulate trap filter regenerative system thus constructed, the burner 4 located on the upper flow side of the particulate trap filter 2 is ignited to inject a flame in the first place, and the flame is applied to the flame distributor 5 which is installed in the cylindrical housing 3 having a fairly larger diameter than that of an injection port 7 for the flame in such a way that it crosses with the extension line of an axis 8 of the particulate trap filter 2 at an angle greater by 10 to 20 degrees than an injection angle 9 of the burner 4. The flame flow is then produced to have a turbulence by a plurality of through holes 10 made in the flame distributor 5 and to be separated by a plurality of fins 11 formed on the surface of the flame distributor 5 in parallel at right angles to a plane including the flame injection axis and the filter axis 8. The ceramic honeycomb disc body 6 which is disposed on the lower flow side of the flame distributor 5 and immediately before the particulate trap filter 2 at right angles to the extension line of the axis 8 of the particulate trap filter 2 reduces the temperature variation caused by the pulsation of the flame to result in a uniform flame flow in front of the particulate trap filter 2 on the upper flow side thereof.

One of the exemplary embodiments of the particulate trap filter regenerative system in accordance with this invention will be described in detail as follows.

In a cylindrical housing 3 installed in an exhaust pipe 1, a particulate trap filter 2 having a diameter of 200 mm composed of a honeycomb structure made of cordierite was housed, and a burner 4 having a flame injection port of 40 mm in diameter was installed on the upper flow side of the particulate trap filter 2 in such a way that a flame injection angle 9 of 45 degrees was formed with respect to the extension line of an axis 8 of the particulate trap filter 2. An elliptic flame distributor 5 made of sintered silicon nitride ceramics and provided with plural through holes 10 of 5.5 mm in diameter whose major axis was about 230 mm and minor axis was 200 mm, and about 30% of whose area was occupied by the total area of openings 12 of the through holes 10 was installed in such a way that it crossed with the extension line of the axis 8 of the particulate trap filter 2 at an angle of 60 degrees.

Into the particulate trap filter thus constructed, a variety of flames different in flow speed were injected from the burner 4 and measurements of the vertical temperature distribution in the cylindrical housing 3 were made on the lower flow side of the flame distributor 5 and it was found that the wide temperature distribution having a temperature variation of about 400° C. maximum indicated when the flame distributor 5 was not installed was remarkably reduced to about 200° C.

In addition, on the surface of the flame distributor 5 to which the flame was applied fins 11 1 mm thick and 4.5 to 5.5 mm high protruding therefrom were installed at four positions of 45 mm, 75 mm, 105 mm, and 135 mm starting from the top of the major axis mentioned above nearest to the burner 4 in such a way that the farther they were located from the burner 4, the higher their height became. The flame was applied as previously mentioned and measurements of the vertical temperature distribution in the cylindrical housing 3 were made and it was found that the temperature variation was reduced to about 100° C. or less.

On the lower flow side of the flame distributor 5 with the fins a cordierite honeycomb disc body 6 having 82 cells per square inch was installed and the temperature variation at a fixed point located on the lower flow side of the honeycomb disc body 6 was measured to find the temperature variation could be fairly reduced to about 10° C. or less.

As a result, it has been confirmed that the temperature distribution of the flame at the inlet of the particulate trap filter can be controlled almost uniformly.

In accordance with this invention, by the provision of a burner having a flame injection angle with respect to the extension line of the axis of a particulate trap filter and a flame distributor provided with plural through holes which is installed at an angle greater than the flame injection angle of the burner, the temperature distribution of the flame at the inlet of the particulate trap filter can be made almost uniform in spite of a variation of the burner flame in flow speed and the particulates trapped in the filter will be burned off evenly to eliminate the loading of the particulates to the particulate trap filter uniformly without causing the damage including cracks or fusing of the filter, thereby a particulate trap filter regenerative system having high reliability and excellent durability can be obtained.

What is claimed is:

1. An exhaust gas particulate trap filter regenerative system comprising:

a cylindrical housing disposed in an exhaust pipe;

a particulate trap filter housed in the housing for collecting particulates of exhaust gas therein and having an upper flow side and a lower flow side, and a longitudinal axis; and a burner disposed on the upper flow side of the filter for injecting a flame into the filter and burning off the particulates collected;

said particulate trap filter regenerative system being characterized in that said system further comprises a flame distributor provided with plural through holes between the particulate trap filter and the burner, and that the burner is installed in such a way that the flame injection axis thereof crosses with the extension line of the axis of the particulate trap filter at an angle of 35 to 55 degrees and said flame distributor is disposed in such a way that it crosses with the extension line of the axis of the particulate trap filter at an angle which is greater by 10 to 20 degrees than the flame injection angle of the burner.

2. A particulate trap filter regenerative system according to claim 1 wherein the particulate trap filter regenerative system further comprises a ceramic honeycomb disc body between the particulate trap filter and said flame distributor immediately after the lower flow side thereof.

3. A particulate trap filter regenerative system according to claim 2 wherein said ceramic honeycomb disc body is made of sintered ceramics selected from cordierite ($2MgO.2Al_2O_3.5SiO_2$) and silicon nitride ($Si_3N_4$).

4. A particulate trap filter regenerative system according to claim 1 or claim 2 wherein said flame distributor is provided with a plurality of parallel fins on the surface of the flame distributor to which the flame is directly applied.

5. A particulate trap filter regenerative system according to claim 1 or claim 2 wherein said flame distributor is made of sintered ceramics selected from silicon nitride ($Si_3N_4$), silicon carbide (SiC), cordierite ($2MgO.2Al_2O_3.5SiO_2$) and mullite ($3Al_2O_3.2SiO_2$) or heat-resistive alloy.

6. A particulate trap filter regenerative system according to claim 5, wherein said heat-resistive alloy includes stainless steel.

7. A particulate trap filter regenerative system according to claim 1 wherein said plural through holes provided in said flame distributor are about 3 to about 10 mm, in diameter, and the total area of openings occupied by the through holes is within the range of 25 to 35% of the surface area of said flame distributor.

8. A particulate trap filter regenerative system according to claim 7, wherein the plural through holes in said flame distributor are about 5.5 mm in diameter.

* * * * *